Dec. 13, 1927. 1,652,528
M. P. HOLMES
TRUCK
Filed March 22, 1924
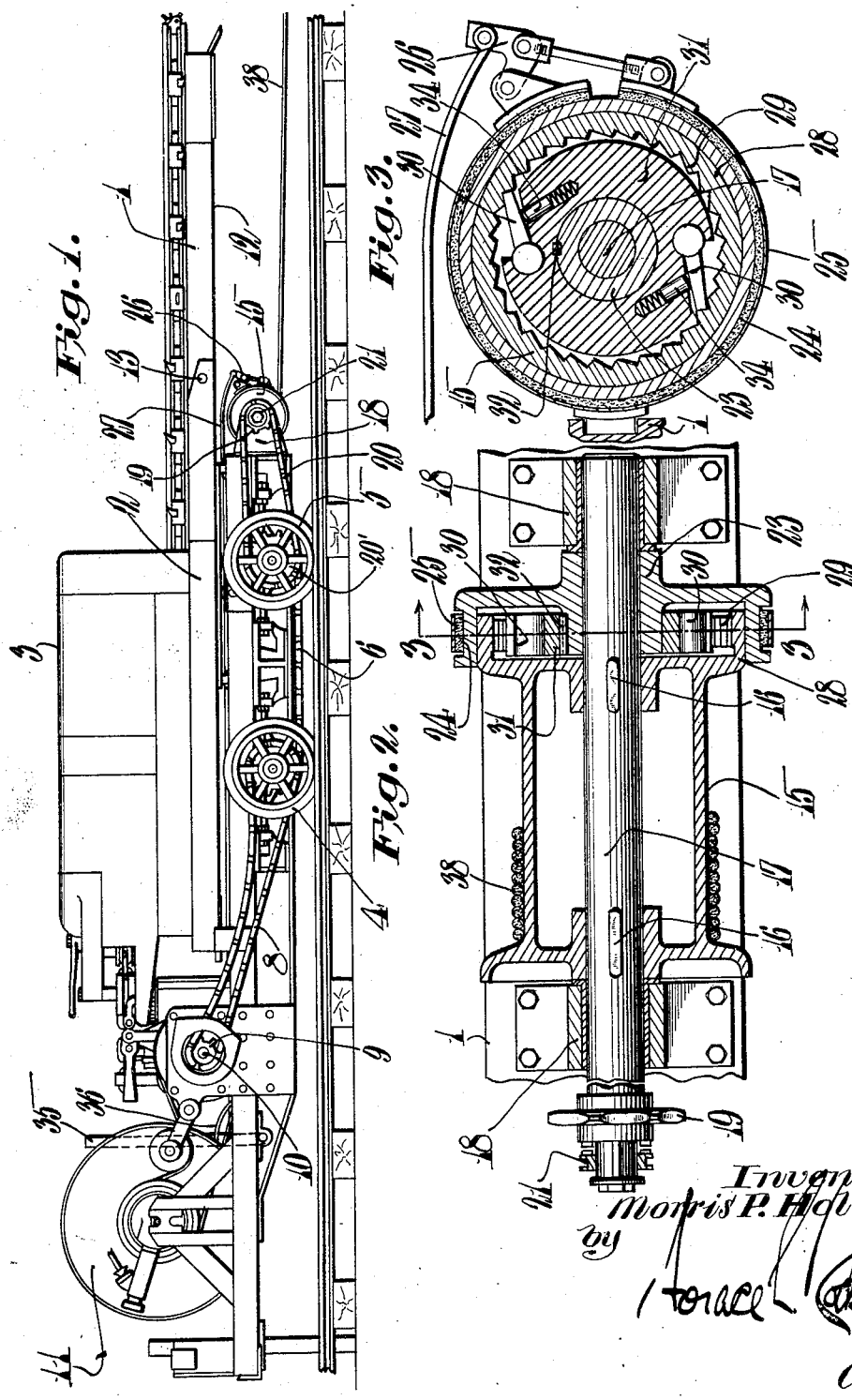

Patented Dec. 13, 1927.

1,652,528

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

Application filed March 22, 1924. Serial No. 701,222.

My invention relates to trucks and more especially to mining machine trucks.

An object of my invention is to provide an improved means whereby a mining machine may be moved about a mine, the particular end to be attained being the provision of improved means whereby the machine may be transported up or down the sharp grades or pitches so often encountered in mine tracks, and the provision of means adapted for this purpose of a type in which the mechanism is of such a nature that in the event of breakage of the drive, the sudden release of the machine may be prevented. More specifically, an object of my invention is to provide a supplemental propulsion mechanism for a mining machine truck of a type which may be driven from the usual propulsion mechanism for the truck and which is provided with automatic mechanism of a type for preventing unintended rearward rotation thereof but which can nevertheless be permitted to rotate rearwardly if desired. These and other objects of my invention will hereinafter more fully appear.

In the accompanying drawings I have shown for purposes of illustration one form which my invention may assume in practice.

In these drawings,—

Fig. 1 is a view in side elevation of a mining machine truck supporting a mining machine and provided with a mechanism constituting an illustrative embodiment of my invention.

Fig. 2 is a transverse vertical section through the auxiliary propulsion mechanism.

Fig. 3 is a vertical section on the line 3—3 of Fig. 2.

In the illustrative embodiment of my invention I have shown the same applied to a mining machine truck which is generally designated 1. The truck 1 carries upon the upper portion 2 thereof a mining machine 3 of usual form. The truck is supported by the truck wheels 4 and 5, and the latter are connected together for simultaneous rotation by a flexible connection, herein a sprocket chain 6 cooperating with sprocket wheels (not shown) on the axles which support the wheels 4 and 5. The wheel 4 is adapted to be propelled by a sprocket chain connection 8 driven from a sprocket 9 on the transverse shaft 10 carried by the truck and adapted to be propelled in a well known manner by the mining machine. The propulsion of the shaft 10 by the mining machine is so controlled that this shaft may be either positively driven or may be totally disconnected from the mining machine with the result that when the latter condition obtains, the sprocket 9 will be entirely free to rotate. The truck carries an electric cable reel 11 which may be driven if desired whether the sprocket 9 is rotated or not. The truck carries a tiltable machine supporting frame 12 pivoted at 13 for tilting during loading or unloading of a machine, upon which the machine rests. Arranged adjacent the forward end of the body of the truck and beneath tilting frame 12 is a reel member 15 keyed as at 16 on the shaft 17 which extends transversely and is journaled in suitable brackets 18. The shaft 17 carries a sprocket 19 of such size that it may be driven by a chain 20 and sprocket 20' upon the forward axle of the truck at such a rate that its peripheral or winding speed will be equal to the peripheral speed of the truck wheels. To permit disconnection of the sprocket from the shaft when desired a usual toothed-clutch 21 is provided. It will be observed that journaled upon the shaft 17 is a sleeve member 23 which carries a braking surface 24 with which a brake band 25 adapted to be actuated by a suitable leverage 26 under the control of a manually operable rod 27 is arranged. It will be noted that the right hand end flange 28 of the drum 15 is provided upon its inner periphery with a series of ratchet teeth 29 and these are adapted to cooperate with pawls 30 carried by a pawl carrier 31 keyed as at 32 to the member 23. Suitable spring pushed pins 34 normally maintain the pawls in engagement with the teeth of the ratchet. It will be apparent when the arrangement of the parts is noted that the drum may wind in with the teeth of the ratchet slipping over the pawls but that reverse movement of the drum will be impossible unless the brake band 25 is sufficiently released to permit rotation of the element 23. A suitable manual control including the lever 35 and segment 36 is provided for the rod 27.

From this description the mode of operation can readily be understood. Let it be assumed that a flexible member herein a cable 38 is suitably secured to the drum 15 and that the mining machine truck is at the bottom of a hill which is to the right of the end of the truckway shown in Fig. 1 and that it is desired to employ the auxiliary mechanism in moving the machine up the hill. It will be evident that with the truck wheels rotating in a clockwise direction the truck will be propelled by them toward the top of the hill and it will be further evident that the drum will be similarly rotated if the clutch 21 is connected. As a result the drum will wind in the cable 38 and will aid in pulling the machine up the hill. During this winding operation of the drum the ratchet teeth will slip over the pawls and the drum will be freely rotatable. Suppose, however, that any of the driving connections for the truck wheels or for the drum were to break. It will then be evident that if the brake band 25 is in tight engagement with the surface 24 no unwinding of the rope will be possible, for as soon as any tendency to unwind is manifested the pawls will immediately check it. If it is desired to let the machine down a hill that is too steep for the wheels to safely be counted upon to retard truck movement, it will be evident that the sprocket 9 may be, if desired, disconnected from driving relation with the motor, or the clutch 21 disconnected, the cable 38 connected at the top of the hill and by controlling the mechanism 26 the cable can be gradually allowed to pay out, the brake band slipping as the machine moves down the hill. The rope may be wound in different directions, depending on what direction the truck is to move in descending the hill. Moreover, if desired, by lashing the cable to the drum the reel may be used as the regular brake for the truck, by having the clutch 21 connected, in so far as running in one direction is concerned. A brake cooperating directly with the truck wheels may, however, be provided as usual.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a truck, a truck frame adapted to support a mining machine having a motor, truck propulsion mechanism thereon adapted to be driven by said mining machine motor and including running gear and driving mechanism therefor, a winding member on said truck frame, a flexible member adapted to be wound on said member, driving connections between said truck propulsion mechanism and said winding member, and ratchet mechanism automatically operative to prevent paying out of said flexible member including relatively movable ratchet and pawl elements one of which is stationary during winding.

2. In a truck, a truck frame adapted to support a mining machine having a motor, truck propulsion mechanism thereon adapted to be driven by said mining machine motor and including running gear and driving mechanism therefor, a winding member on said truck frame, a flexible member adapted to be wound on said member, driving connections between said running gear and said winding member, and ratchet mechanism automatically operative to prevent paying out of said flexible member including relatively movable ratchet and pawl elements one of which is stationary during winding.

3. In a truck, a truck frame, truck propulsion mechanism thereon including running gear and driving mechanism therefor, a winding member on said truck frame, a flexible member adapted to be wound on said member, driving connections between said truck propulsion mechanism and said winding member, and brake controlled ratchet mechanism automatically operative to prevent paying out of said flexible member.

4. In a truck, a truck frame, truck propulsion mechanism thereon including running gear and driving mechanism therefor, a winding member on said truck frame, a flexible member adapted to be wound on said member, driving connections between said running gear and said winding member, and brake controlled ratchet mechanism automatically operative to prevent paying out of said flexible member but releasable to permit controlled paying out thereof.

5. In a mining machine truck, a truck frame adapted to support a mining machine, running gear, means for propelling the latter, and means beneath said frame at the forward side of said running gear and driven by the latter for winding in a flexible member to cooperate in the moving of said truck.

6. In a mining machine truck, a truck frame having a tilting portion adapted to support a mining machine, running gear, means for propelling the latter, and means beneath said frame at the forward side of said running gear for winding in a flexible member to cooperate in the moving of said truck.

7. In combination with a truck having primary propulsion mechanism, auxiliary truck moving means including a reel, a reel driving shaft, driving means for said reel driving shaft, a ratchet wheel coaxial with said drum, a pawl carrier coaxial with said drum carrying pawls cooperating with said ratchet wheel, means for braking the rotation of one of said two last mentioned elements, and an operating connection between the other and said drum.

8. In combination with a truck having primary propulsion mechanism, auxiliary truck moving means including a reel, a reel driving shaft, driving means for said reel driving shaft, a ratchet wheel carried by said drum, a pawl carrier coaxial therewith and carrying pawls cooperating with said ratchet wheel, and means for controlling the rotation of said pawl carrier.

9. In combination with a truck having primary propulsion mechanism, auxiliary truck moving means including a reel, a reel driving shaft, driving means for said reel driving shaft, a ratchet wheel carried by said drum, a pawl carrier coaxial therewith and carrying pawls cooperating with said ratchet wheel, and a friction brake for controlling the rotation of said pawl carrier.

10. In combination with a truck having primary propulsion mechanism, auxiliary truck moving means including a reel, a reel driving shaft, driving means for said reel driving shaft including a clutch controlled sprocket coaxial therewith, a ratchet wheel carried by said drum, a pawl carrier coaxial therewith and carrying pawls cooperating with said ratchet wheel, and means for controlling the rotation of said pawl carrier.

11. In a truck mechanism, a truck frame, running gear therefor, propulsion mechanism for said running gear, a drum operatively connectible with said running gear for driving thereby, and means associated therewith operable to effect controllable braking of said truck when the latter is running in one direction, but not during running in the reverse direction.

12. In combination, a support, a rotatable shaft journaled thereon, means for effecting motion of translation of said support, driving means for said shaft adapted for actuation by said first mentioned means, a winding member rotatable by said shaft, and ratchet and pawl mechanism comprising elements rotatable relative to each other, one of said elements being operatively connected with one of said rotatable members, and friction means for holding the other stationary.

13. In combination, a support, means for effecting translation of said support at a certain rate, and a device operative to support said support on failure of said first mentioned means including a flexible connection, winding means associated therewith, and means cooperating with said winding means to shorten the flexible connection substantially at the same rate as the rate of translation of said support, and friction controlled ratchet means for preventing reverse rotation of said winding means.

14. In combination, a support, means for effecting translation of said support at a certain rate, and a device operative to support said support on failure of said first mentioned means including a flexible connection, winding means associated therewith, and means cooperating with said winding means and operated by said first mentioned means to shorten the flexible connection substantially at the same rate as the rate of translation of said support, and friction brake controlled ratchet means for preventing reverse rotation of said winding means.

In testimony whereof I affix my signature.

MORRIS P. HOLMES.